United States Patent
Yabuta

[15] 3,675,757
[45] July 11, 1972

[54] ELECTROMAGNETIC EDDY CURRENT INDUCTION TYPE CONVEYING METHOD

[72] Inventor: Yukio Yabuta, Odawara-shi, Japan
[73] Assignee: Fuji Photo Film Co., Ltd., Kanagawa, Japan
[22] Filed: Dec. 24, 1969
[21] Appl. No.: 887,836

[30] Foreign Application Priority Data
Dec. 28, 1968 Japan..................................44/981

[52] U.S. Cl.................................198/41, 310/12
[51] Int. Cl..................................B65g 47/00
[58] Field of Search..................198/31, 41; 310/12, 13

[56] References Cited
UNITED STATES PATENTS
1,441,250  1/1923  Smith.........................198/41
2,767,823  10/1956  Beamish.....................198/41
3,113,042  12/1963  Hall.............................198/41
3,167,168  1/1965  Park.............................198/31
3,333,124  7/1967  Francis et al................310/12
3,482,124  12/1969  Pelenc........................310/12

Primary Examiner—Evon C. Blunk
Assistant Examiner—Douglas D. Watts
Attorney—Sughrue, Rothwell, Mion, Zinn & Macpeak

[57] ABSTRACT

An electromagnetic induction conveying apparatus having a plurality of spaced apart stationary coils for providing a shifting magnetic field and a controller to vary the input to the coils, thereby controls both the direction of travel and the position of an electrically conductive object conveyed by the stationary coils due to eddy currents set up within the object by the shifting magnetic field.

2 Claims, 8 Drawing Figures

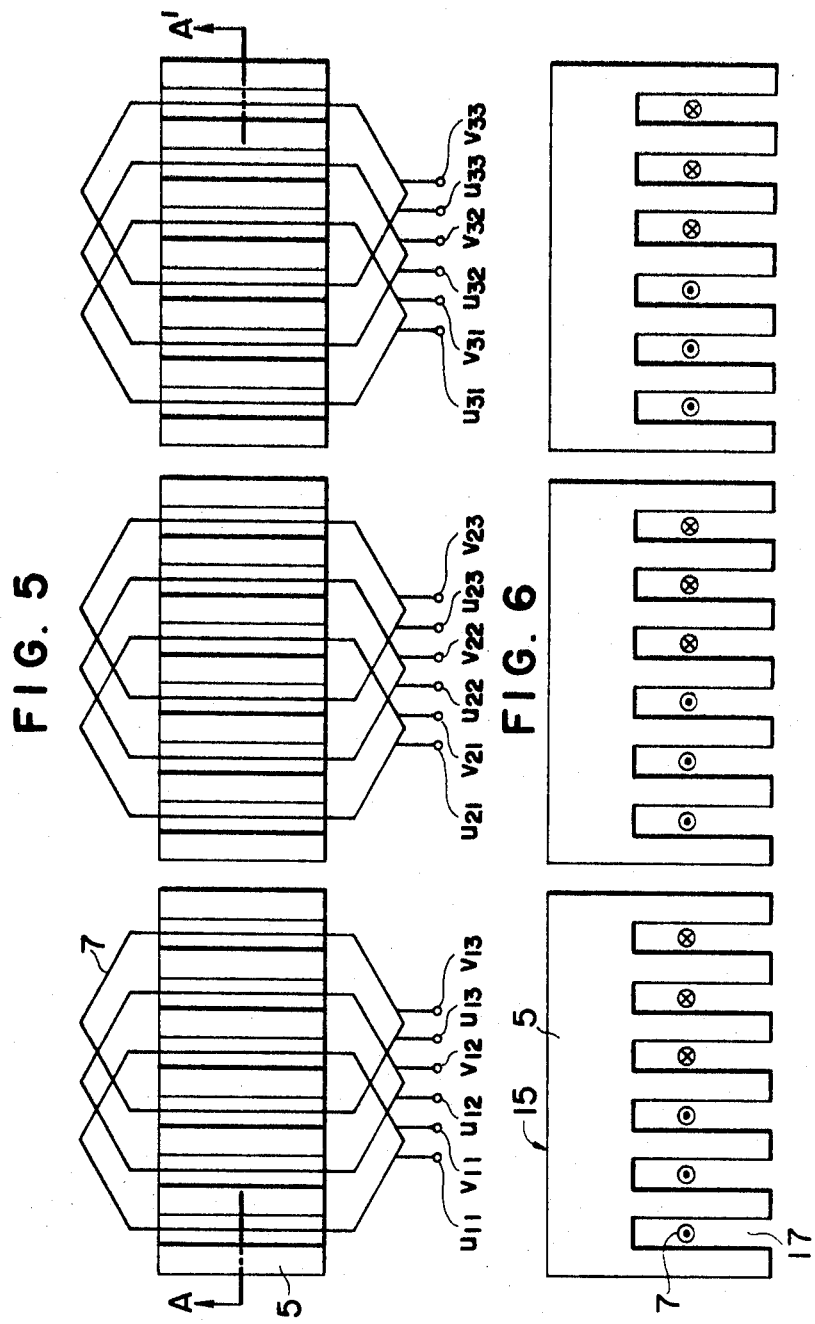

3,675,757

ELECTROMAGNETIC EDDY CURRENT INDUCTION TYPE CONVEYING METHOD

BACKGROUND OF THE INVENTION

1. Field of the Invention

This invention relates to an object conveying apparatus utilizing electromagnetic induction.

2. Description of the Prior Art

Heretofore, in conveying or transporting an object it has been necessary to provide an intermediate element between the driving part and the driven part or conveyed object to transmit the conveying energy or force from the driving part to the driven part and wherein the intermediate element has a contact surface utilizing mechanical friction to transmit the energy.

For instance, when conveying an object by means of a belt conveyor, the object is in mechanical contact with the conveyor belt and the conveying energy generated from the prime mover is transmitted to the object through the mechanical friction between the conveyor belt and the object. Whenever the conveying direction is changed in a conveyor of the conventional type, it has been necessary to add an additional conveyor to the original or provide another auxiliary frictional surface or means to the conveyor. Further, in the conventional conveyor, there is an additional disadvantage in that it is very difficult or impossible to vary the conveying speed in a portion of one conveyor line because the conveyor belt is of the single endless type. In order to vary the speed in one portion of a conventional conveying line, it is necessary to cut the conveyor line at the portion and add another conveyor having a different conveying speed at that portion. In such a case, the construction of the apparatus becomes complicated. Furthermore, it has been impossible to stop, convey backward or turn the object partly on one continuous conveyor line without the use of an auxiliary device.

The use of a linear motor as a device for conveying or moving an object linearly is known. This device is equivalent to an induction motor having a rotor and stator whose radius is infinitely long. The linear motor is equivalent to the bearing of the induction motor provided with a means for controlling the direction of movement of the rotor. According by a linear motor, the object can be conveyed linearly along a rail without the use of any mechanical means, however, the conveying direction of the object is limited to the linear direction along the rail.

The principal object of the present invention is to provide a novel conveying apparatus which conveys an object in any direction without employing mechanical means. This and other objects will be made apparent by the following description of preferred embodiments of the invention taken in conjunction with the accompanying drawings in which:

DESCRIPTION OF THE DRAWINGS

FIG. 5 is an explanatory view showing an example of the arrangement of coils employed in the conveying apparatus in accordance with the present invention, FIG. 6 is a sectional view showing the winding direction of the coils taken along the line A—A' in FIG. 5.

DETAILED DESCRIPTION OF PREFERRED EMBODIMENT

Figure 1:
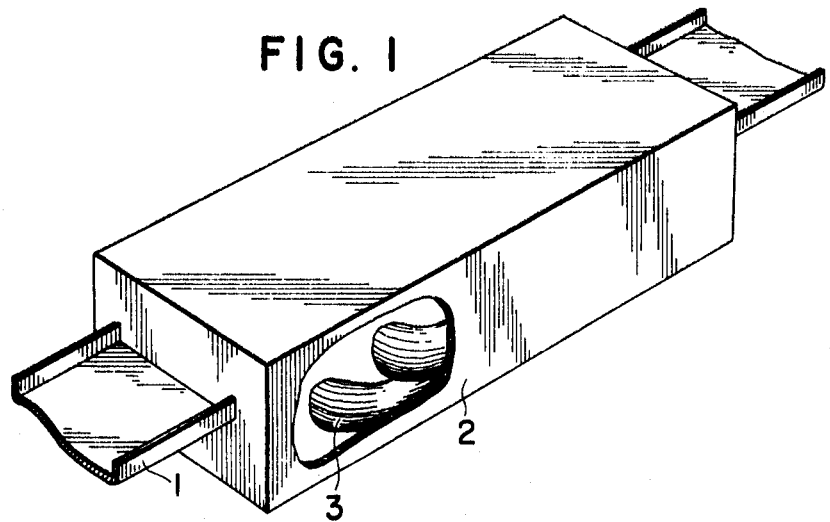
FIG. 1 is a perspective view showing the main portion of the conventional linear motor.

Now referring to FIG. 1, the conventional linear motor consists of an armature rail 1 (corresponding to the stator in an induction motor), an iron member 2 (corresponding to the rotor in an induction motor), and coils 3 wound in the iron member 2. The iron member 2 is guided along the armature rail 1. The iron member 2 is conveyed along the rail 1 linearly without utilizing any rotatory movement by means of electromagnetic induction. A linear motor has the disadvantage that the movement of the object to be conveyed is limited to the linear motion along the rail. Because the efficiency of a linear motor is low, the linear motor requires a large amount of input current and thus the temperature of the coils 3 is large. The coils 3 are not easily cooled, and therefore the linear motor cannot be used for a continuously long time. In the case where the linear motor is used under the conditions of 110 V voltage, 50 HZ frequency, and 2.4 A current, the rated time for continuous use is about 40 sec.

This invention provides a novel conveying apparatus which eliminates the above disadvantages of the conventional linear motor and the conventional conveyor. According to the present invention there is provided a conveying apparatus utilizing electromagnetic induction which comprises a number of stationary coils arranged to effect a shifting magnetic field, and an input controlling means for controlling the input into the coils, thereby conveying an object of electric conductive material by means of the electromagnetic force generated by electromagnetic induction.

Figure 2:
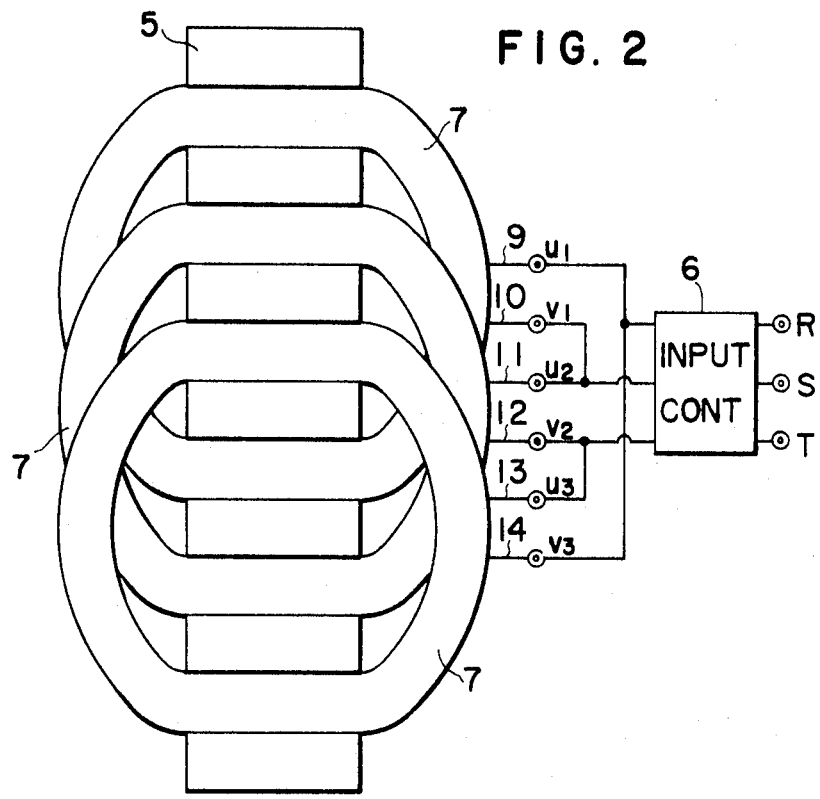
FIG. 2 is a view showing the electric circuit employed in one embodiment of the conveying apparatus in accordance with the present invention.
Figure 3:
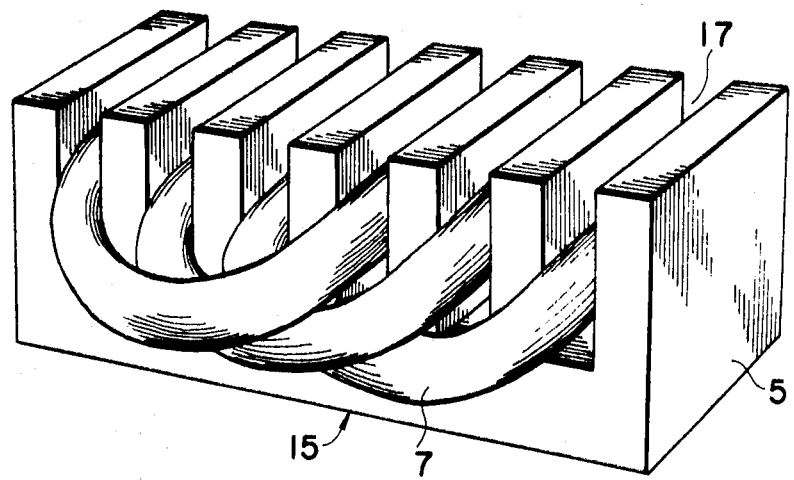
FIG. 3 is a perspective view showing the main part of an embodiment of the conveying apparatus in accordance with the present invention shown in FIG. 2.
Figure 4:
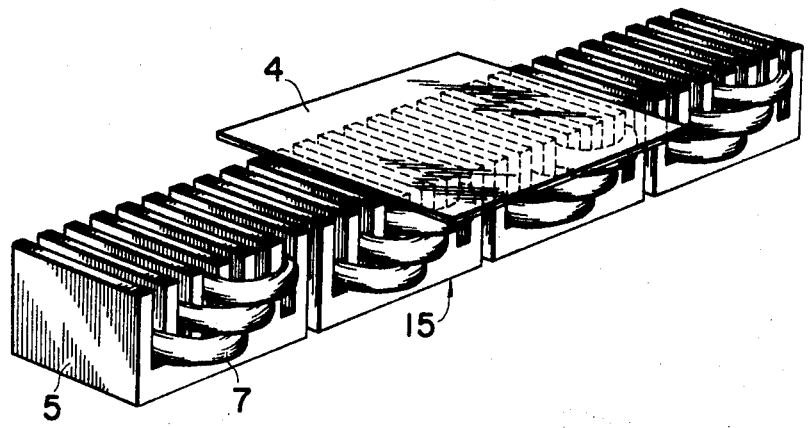
FIG. 4 is a perspective view showing an embodiment of the conveying apparatus in accordance with the present invention shown in FIGS. 2 and 3.

The construction of the conveying apparatus in accordance with the present invention will now be described in detail referring to the drawings. As shown in FIGS. 2, 3 and 4 an iron core 5 is provided with a number of parallel grooves 17 extending laterally and opened to the object side. Coils 7 are wound on the iron core so as to generate a shifting magnetic field at the grooves 17. The reference numerals 9, 10, 11, 12, 13 and 14 indicate outgoing lines from the coils 7, which are connected to an input controller 6 in e.g. delta connection. The input controller 6 is connected with a three-phase alternating sources R,S, and T. The reference numeral 4 indicates an object to be conveyed on the surface of the iron core 5. Numeral 15 indicates a conveying unit consisting of the iron core 5 and coils 7. FIG. 5 shows the conveying units 15 arranged in series, and FIG. 6 shows the conveying units 15 arranged in parallel.

Figure 8:
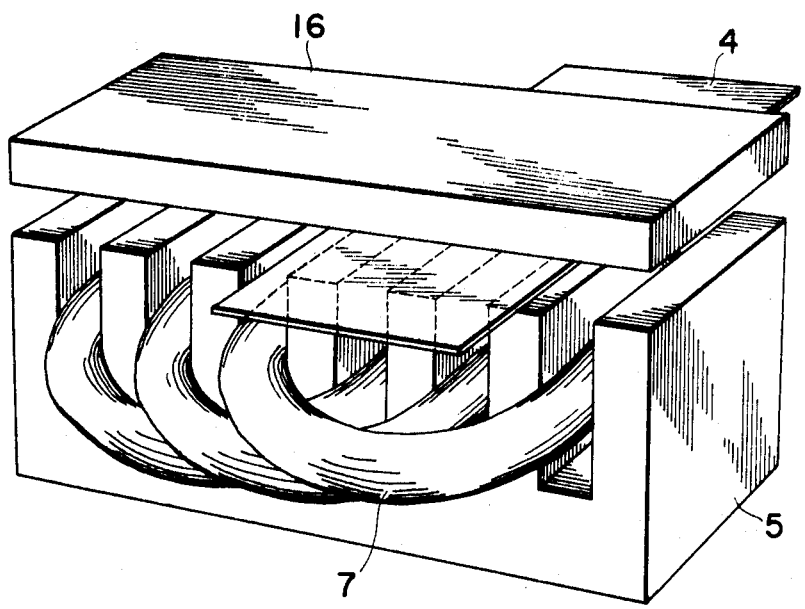
FIG. 8 is a perspective view showing another embodiment of the conveying apparatus in accordance with the present invention.

FIG. 8 illustrates an embodiment wherein a second iron core 16 is disposed above the conveying unit 15 and an object 4 to be conveyed e.g. an iron plate is positioned between the unit 15 and the second iron core 16.

In operation, three-phase alternating current is supplied to the coils 7 through the input controller 6 and outgoing lines 9, 10, 11, 12, 13 and 14 to generate a shifting magnetic field. The current may also be of the two-phase alternating type and in such a case the three-phase connection shown in FIG. 2 should be two-phase connection. On the upper face of the iron core 5 which is the pole face of the shifting field, an object to be conveyed, e.g. a metal plate is positioned e.g. close relationship therewith. Thus, when an induced current (eddy current) is produced in the metal plate or other object 4, the metal plate is conveyed in the direction lateral to the moving direction thereof. Further, because of the electromagnetic force caused by the induced current and the shifting magnetic field, the metal plate 4 is conveyed in the shifting direction of the magnetic field. The force required to convey the metal plate is in proportion to the magnetic flux generated if the conductivity of the metal plate and the space between the metal plate and the pole face of the electromagnetic induction conveyor are fixed. The conveying speed can be easily controlled or varied by controlling the input or changing the number of poles. If the metal plate 4 is made of a magnetic material, a non-magnetic roll or guide member should be disposed between the iron core 5 and the metal plate 4. The roll or guide member should be made of non-magnetic material or material other than iron, nickel or cobalt.

The effects or advantages of the conveying apparatus in accordance with the present invention will now be described in detail.

First, the metal plate 4 to be conveyed can be conveyed in an optional direction in a plane by making the pole-faces of the unit 15, which has the coils 7, aligned with one another in the same plane and then by electrically energizing the unit 15.

Second, the conveying apparatus can be operated continuously because the coils 7 can be cooled.

Third, the object 4 to be conveyed, e.g. a metal plate, can be stopped during its conveyance. When the object 4 to be conveyed is conveyed at a slow speed, the input to the unit 15 of the electromagnetic conveying apparatus is cut off only at the portion where the object to be conveyed is desired to be stopped during its conveyance. When the object to be conveyed is conveyed at a fast speed, the direction of the shifting magnetic field is partly reversed thus a braking effect is exerted by the unit 15 and the metal plate is stopped at that portion of the apparatus.

Fourth, it is also a great advantage that there is no need to dispose any material, solid or liquid, between the object to be conveyed and the conveying unit of the conveying apparatus to thereby transmit the conveying power from the unit to the object to be conveyed.

Fifth, because the conveying apparatus is a completely stationary machine and different from the conventional mechanical conveyor, the construction thereof is simple, trouble free, and it can be controlled easily.

Sixth, the object to be conveyed can be conveyed at high speed such as those of the catapult type.

Seventh, because the conveying unit 15, which is supplied with electric current, is stationary and therefore different from the conventional linear motor, there is no difficulty in supplying electric current to the apparatus.

Eighth, the object to be conveyed can be subjected to induction heating while it is being conveyed.

Ninth, an object located in an isolated place can also be conveyed. For example, an object can be conveyed in a container having a high pressure, in a fluid tank, or in a deleterious atmosphere such as $H_2SO_4$, $HNO_3$ HCl, $Cl_2$ and the like.

Figure 7:
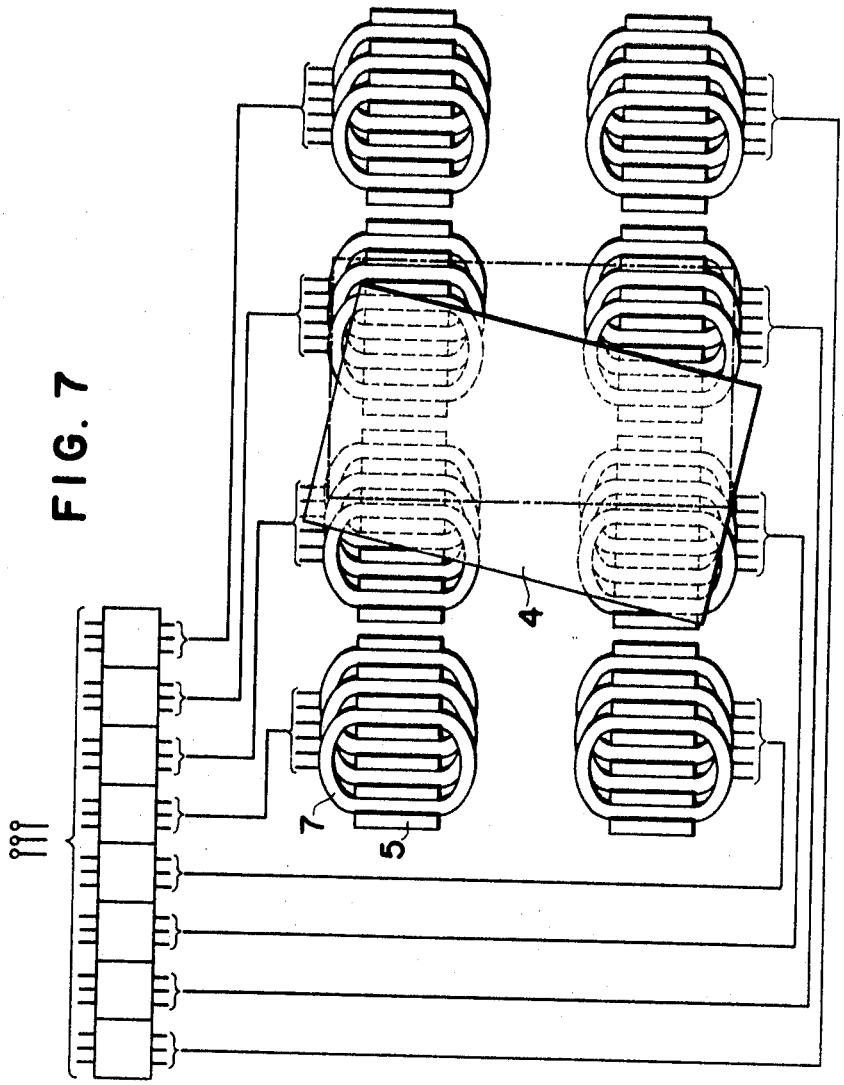
FIG. 7 is a plan view showing another embodiment of the conveying apparatus in accordance with the present invention illustrated with an input system.

Tenth, the lateral position of the object can be controlled while being conveyed. As shown in FIG. 7, if the electromagnetic conveying units are arranged in parallel, the magnetic flux can be controlled partially so as to control the lateral position of the object by controlling the input to the coils 7 independently. That is, if the object is put partly on one electromagnetic unit and partly on another electromagnetic unit and then if the magnetic flux one of the units is varied, the induction eddy current in the unit varied is thus controlled and the electromagnetic force exerted on the object is varied only at the portion above the controlled unit resulting in a change in the direction of conveyance. Thus, the direction of the object can be adjusted while being conveyed.

As described hereinabove, in accordance with the present invention, the conveying device requires no mechanical intermediary for transmitting the power necessary for conveying an object, it can convey an object spaced from the unit or even in an isolated place, it can convey an object in any direction, it can stop the object at any position in the conveying line, it can heat the object easily while conveying it, it can be cooled while conveying objects because it is stationary, it can be operation continuously, and it has no limitations with regard to the supplying of electric current thereto. Moreover, by arranging the units in parallel, the object to be conveyed can be controlled both as to its lateral position and direction.

What is claimed is:

1. Apparatus for conveying an object of electrically conductive material by electromagnetic induction, said apparatus comprising:

a pair of parallel conveying units for supporting and conveying the object, each of said conveying units comprising a plurality of stationary coils disposed along the length of the conveying unit, and means for selectively energizing said coils to produce a shifting magnetic field and to create eddy currents within the object, thereby causing the object to be moved along the conveying units by induced electromagnetic force generated by the eddy currents, and means for separately controlling said energizing means and thus the shifting magnetic fields of each conveying unit, whereby the position of the object can be varied by causing it to turn as it is advanced along the conveying units.

2. The apparatus of claim 1 wherein said energizing means comprise input controllers connected with multi-phase alternating current sources.

* * * * *